Sept. 25, 1928.  
E. B. FOOTE  
THERMOMETER  
Filed March 3, 1927

1,685,193

INVENTOR:
Edward B. Foote
BY Alfred Burger,
his ATTORNEY

Patented Sept. 25, 1928.

1,685,193

UNITED STATES PATENT OFFICE.

EDWARD B. FOOTE, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER.

Application filed March 3, 1927. Serial No. 172,477.

This invention relates to a thermometer specially adapted for co-operation with engines the operation of which entails considerable vibration, such as steam turbines and internal combustion engines and more in particular Diesel engines.

In order to obtain the best results with Diesel engines or engines of similar character, it is practically necessary to watch the temperature of the products of combustion of each cylinder. On the surface, the problem is simple and requires merely the placing of the temperature responsive part of a thermometric device into the exhaust of each cylinder and indicating the heat reaction. While it would seem that a large number of thermometric devices is available for that purpose, the practical application presents a problem which is not as simple as it might appear.

Most, if not all of the many constructions heretofore evolved and employed for the measurement of temperatures of the order met with in Diesel engines, would not withstand the forces set up by the vibrations so as to satisfy the requirements in that respect.

It is the primary and principal object of the invention to provide a thermometer which is adapted to successfully withstand the forces induced by vibrations and reacting upon the mechanism of the instrument.

Another substantially concurrent object is the provision of a thermometric instrument the accuracy of which is not vitally affected by continuous vibrations.

Figure 1:
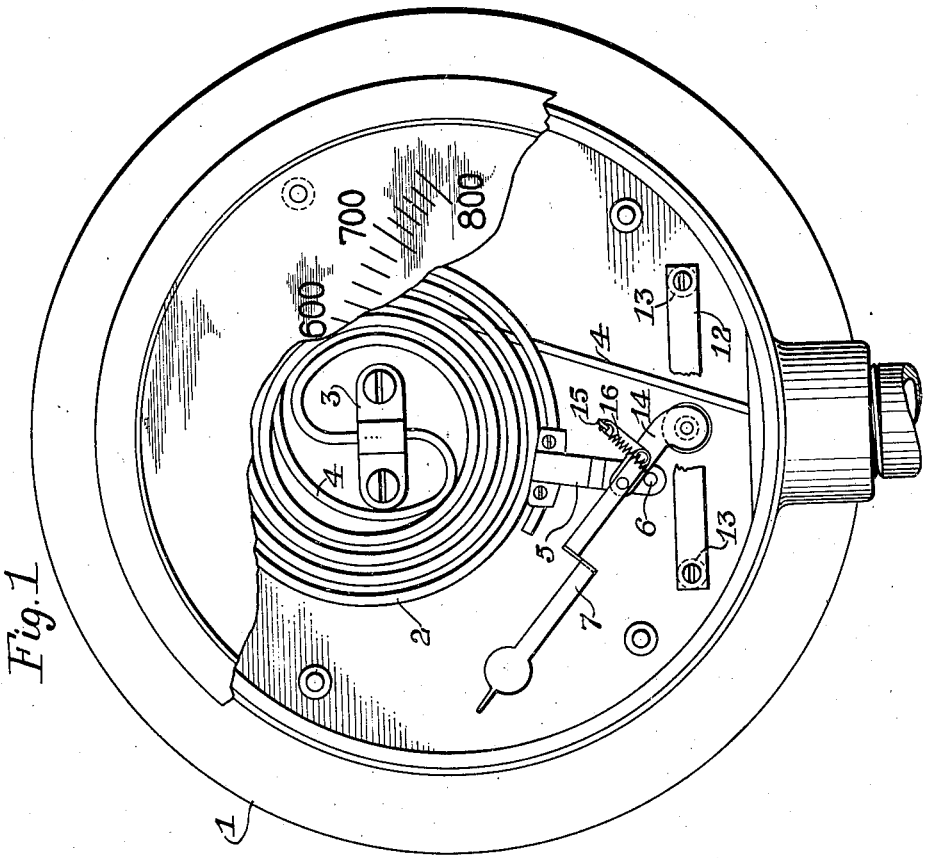
Figure 2:
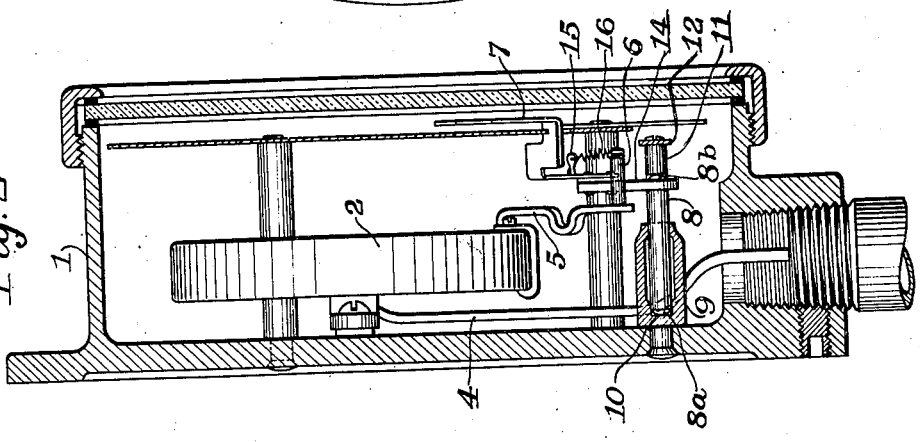

For a full understanding of the invention, the principle of operation on which it is based and its distinctive features, reference is made to the accompanying drawings in which Fig. 1 is a front view of an instrument embodying the invention, parts being broken away to show certain important detail; and Fig. 2 is a vertical section thereof.

In the drawings 1 is a casing of ordinary construction housing and supporting the operating mechanism including primarily a pressure-responsive motor element, a pointer or the like and mechanism for translating motion from the motor element to the pointer.

In the particular instance, the motor element is a spring tube 2 of the Bourdon type the inner end of which is attached to a stationary support 3 which, as is usual, affords a connection between the tube 2 and the capillary tube 4. The outer or movable end of the tube 2 carries a depending arm 5 the free end of which is provided with a pin 6 for co-operation with the pointer 7.

The latter is mounted upon a shaft 8 which is supported in a bearing 9 on the casing 1.

The principal feature for which novelty is claimed, is the translating mechanism just broadly mentioned.

The bearing 9 is preferably recessed between its ends so that the shaft 8 has bearing contact only at the extreme ends whereby the frictional resistance is reduced to a practical minimum. The shaft 8 has convex end surfaces $8^a$ and $8^b$, one establishing a one point contact with the end surface 10 of the bearing 9 while the other end surface contacts with a block 11 which is carried by a spring bar 12 disposed to exert pressure upon the shaft 8 and tending to hold the latter in contact with the bearing surface 10. While there is considerable latitude in respect to the application of spring means acting axially upon the shaft 8, the use of a spring bar 12 is simple and effective. It is supported at its ends upon suitable studs 13.

The pointer 7 is not directly mounted upon shaft 8, but is secured to a relatively stout arm, a bar 14, which is mounted upon the shaft 8. The pin 6 and the bar 14 are of substantial size out of proportion to the force necessary to move the pointer to provide a substantial wearing surface, and are preferably made of materials having a high resistivity to wear.

The bar 14 carries a pin or stud 15 to which is attached one end of a tension spring 16 the other end of which is attached to the outer or free end of pin 6. This spring has the purpose to maintain the pin 6 and the bar 14 in contact relation.

The operation of the instrument is as follows: Assume that the instrument described is one of a series of instruments individually connected with the different combustion chambers of a Diesel engine by means of the usual bulb filled with an expansible fluid such as mercury. The degree of expansion of the fluid or the fluid pressure as measured by the pressure reaction upon the Bourdon spring is then a criterion of the temperature of combustion. This action is common to all instruments of this type and is referred to merely for the sake of completeness.

Under the fluid pressure in the system comprising the bulb, the capillary and the Bourdon spring, the latter expands causing the arm 5, which in effect is a crankarm, to move the bar 14 about the shaft 8 and with it the pointer 7.

The point of contact between the pin 6 and the bar 14 being maintained by means of the spring 16, impact action between the contact surfaces is reduced to a minimum and practically to zero. This is in contradistinction to all forms of instruments employing gears, links and levers interconnected by pivots etc., where the slightest degree of clearance permitting relative motion of the parts, no matter how small such motion initially may be, gives rise to impacts the wearing effect of which is proportional to the distance of free motion i. e. the clearance. In positively interconnected parts such as mentioned it is practically impossible to obtain fits which have no clearance. In fact, in delicate instruments of the type described, perfect fits, aside from the excessive labor and cost of producing them, would introduce an excessive amount of friction which would render the instrument either inoperative or at least useless from a practical point of view.

By the arrangement described I have obtained a construction which has the equivalent of a perfect fit in the sense that the distance between the interlinked parts is reduced to zero and which has a minimum of frictional resistance. The contact between the pin 6 and the block 14 is a line contact only.

This applies equally and even more to the shaft 8 which is held axially under pressure due to spring bar 12. The small bearing surfaces 8ª and 8ᵇ serve to maintain the shaft in a normally centered position while the spring bar 12 eliminates axial play. The spring bar 12 by its axial pressure tends to prevent lateral motion of the shaft and in fact such motion is practically eliminated. While the point contacts at the ends of the shaft 8 have an insignificant resistance, lateral motion and wear are practically eliminated because impact action is practically eliminated.

The train of translating mechanism thus has no positive connection requiring a definite clearance or unrestrained relative motion which could give rise to impact actions. Moreover, what wear there may be or may take place between the ends of shaft 8 and the co-operating surfaces or between pin 6 and the bar 14, such wear can not cause any play or increase of play as in the instruments of the prior art, but is continuously taken up by the spring action of spring bar 12 or spring 16 and neutralized.

I claim:

1. In an instrument of the character described, the combination with a multiple-convolution Bourdon spring, supported at its inner end, of a shaft, a crank bar secured thereto, a pointer carried by the crank bar, an arm secured to the outer end of the spring in a substantially radial direction, a pin extending from the arm in a direction substantially parallel to the axis of the spring and the axis of the shaft, the disposition of the parts being such that the path of the pin as the result of the movement of the spring intercepts the path of the crank arm, and spring means interconnecting the said arm and the crank bar for resiliently holding the latter and the pin in contact relation.

2. In an instrument of the character described, the combination with a pressure-responsive element and a pointer to be moved thereby, of a shaft, a bearing therefor, a thrust bearing at one end of the shaft, spring means for maintaining the shaft axially under pressure against said thrust bearing, the pointer being connected to said shaft and means connected with the pressure-responsive element for angularly moving the shaft.

3. An instrument according to claim 2, in which the spring means includes a spring bar mounted transversely of the shaft and an abutment member carried by the spring bar for bearing upon the free surface of the shaft.

4. In an instrument of the character described, the combination with a pressure-responsive element and a pointer to be moved thereby, of a shaft, a bearing therefor, a thrust bearing at one end of the shaft, spring means for maintaining the shaft axially under pressure against said thrust bearing, a bar mounted upon the shaft and carrying the pointer, an arm connected with the pressure-responsive element and movable therewith, a pin on the arm, normally in contact with the said bar, and spring means between the said arm and the said bar for maintaining the pin in contact with the latter.

5. In an instrument of the character described, the combination with a pressure-responsive element and a pointed to be moved thereby, of a relatively stout shaft, a bearing therefor, including a thrust bearing at one end of the shaft and spaced circumferential bearing portions, spring means for maintaining the shaft axially under pressure against the thrust bearing, the pointer being connected to the shaft near the end opposite the thrust bearing and means connected with the pressure responsive element for actuating the pointer.

6. In an instrument of the character described, the combination with a pressure-responsive element, of a relatively stout shaft carrying at one end a relatively stout crank bar, a composite bearing for the shaft and including as integral parts a thrust bearing at the end of the shaft opposite the crank bar end and a peripheral bearing having bearing contact with the shaft at points spaced from each other, spring means for maintaining the shaft axially under pressure against the thrust bearing, means connected with the pressure-responsive element for actuating the crank bar and a pointer carried by the crank bar.

7. In an instrument of the character described, the combination with a pressure-responsive element and a pointer to be moved thereby, of a shaft, a bearing for supporting the shaft between its ends, a thrust bearing for the shaft at one end thereof, that end being rounded to minimize the surface contact, the pointer being connected to the other end of the shaft, spring means for maintaining the shaft axially under pressure against said thrust bearing, and means connected with the pressure-responsive element for angularly moving the shaft.

In testimony whereof I affix my signature.

EDWARD B. FOOTE.